C. R. TAGGART.
AUTOMOBILE SIGNALING APPARATUS.
APPLICATION FILED FEB. 9, 1915.
1,192,951.
Patented Aug. 1, 1916.
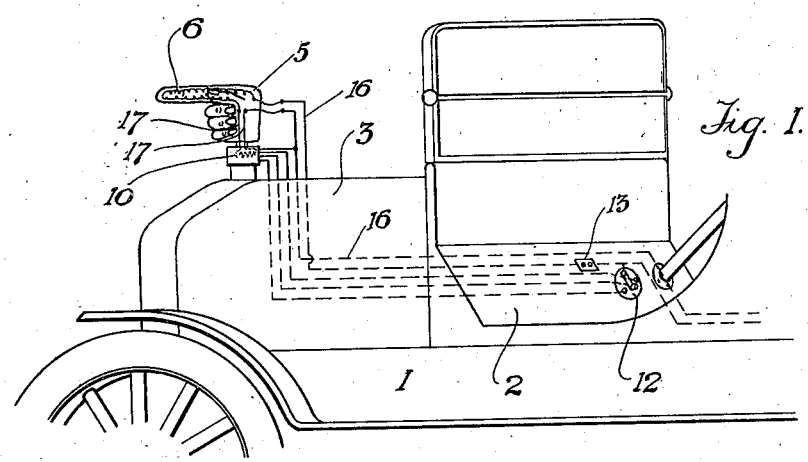
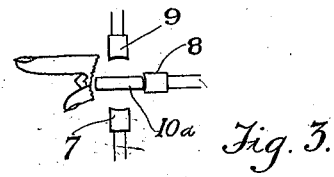
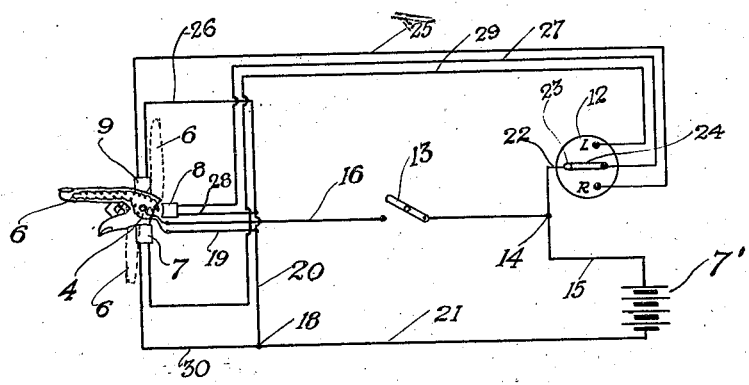
WITNESSES:
Russell K. Annis.
Fred J. Howard
INVENTOR.
CLARENCE R. TAGGART
BY
A. S. McLundie
ATTORNEY.

UNITED STATES PATENT OFFICE.

CLARENCE R. TAGGART, OF CHATTANOOGA, TENNESSEE.

AUTOMOBILE SIGNALING APPARATUS.

1,192,951. Specification of Letters Patent. Patented Aug. 1, 1916.

Application filed February 9, 1915. Serial No. 7,170.

*To all whom it may concern:*

Be it known that I, CLARENCE R. TAGGART, a citizen of the United States, residing at Chattanooga, in the county of Hamilton, State of Tennessee, have invented new and useful Improvements in Automobile Signaling Apparatus, of which the following is a specification.

My invention relates to an automobile signal and has as its principal object the provision of a signal which will indicate to the traffic police, pedestrians, and vehicles the course to be followed by the automobile to which it is attached.

A second object of my invention is to provide an automobile signal particularly adapted for use at night which shall be also convenient for the driver of the automobile.

A final object of my invention resides in the particular arrangement and combination of parts hereafter described.

In the accompanying drawings:—Figure —1— is a perspective view of a portion of an automobile showing my invention as applied thereto. Fig. —2— is a diagrammatic view showing the circuits of the device and showing the signal member in plan view. Fig. —3— is a detailed view of the signal member and a modified form of magnet arrangement.

Referring more particularly to the drawing, 1 indicates an automobile having a dash-board 2 and an engine-hood 3. At the front end of the hood 3, I mount on a pivot 4 a signal 5 in the form of a hand pointing with the index finger. The signal 5 is made of glass or other suitable transparent material so that it may be illuminated at night from the interior. A filament 6 is arranged within the index finger, said filament being supplied with current from the battery 7, through the circuit 20.

In order to position the signal 5 so as to indicate the direction in which the automobile is to travel, I provide three fixed electro-magnets and a movable electro-magnet or permanent magnet as the case may be, the movable magnet being mounted on the signal member 5. The fixed electro-magnets just mentioned are indicated at 7, 8 and 9 respectively, magnet 7 serving to throw the index finger to the right as indicated in dotted line, magnet 9 serving to throw the index finger to the left as also indicated in dotted line, and magnet 8 serving to throw and keep the signal straight ahead as indicated in full lines in both Figs. 1 and 2. The movable electro-magnet is indicated in Fig. 1 at 10 and in Fig. 3 at 10ᵃ. It will be seen that magnet 10 is indicated as an electro-magnet receiving current in series with the filament 6. In Fig. 3, on the other hand, the magnet 10ᵃ is a permanent magnet and consequently needs no current supply. The modification shown in Fig. 3 is consequently better adapted for use in day time when it is not desired to use the filament.

12 is a four-point switch by which either one of the electro-magnets 7, 8 or 9 may be energized. As shown in Fig. 1, the switch 12 is placed on the dash-board 2 in a convenient position for the driver. A switch 13 is provided also for turning off the filament 6 when desired.

Referring more particularly to Fig. 2, it will be seen that current from one side of the battery 7' flows to the point 14 through the wire 15, thence through the switch 13, wire 16 to the filament 6. In the form shown in Fig. 1 the current after passing through filament 6 flows directly through the winding of electro-magnet 10 by means of short leads 17—17 and then returns to the point 18 by means of wires 19 and 20. From point 18 connection is made to the other side of the battery by wire 21.

Tracing now the circuits of the fixed electro-magnets: Starting from the point 14 we pass by a wire 22 to the switch point 23 which may be connected by the arm 24 with either one of three other contacts; for instance if the arm 24 is placed on the contact marked L the current then passes through line 25 to fixed magnet 9 then to wires 26 and 20 to the point 18 and the other side of the battery. Likewise if arm 24 is on the central contact current passes through wire 27 to fixed magnet 8 and thence through wires 28 and 20 to the point 18. If the arm is on the contact marked L current passes through wire 29 to the fixed magnet 7 and thence through wire 30 to the point 18.

Having thus described my invention, what I claim is:

An automobile signaling apparatus, comprising a signaling member capable of motion in a horizontal plane, an electrofilament positioned within said signaling member, electromagnets positioned substantially to the rear and two sides of said member, and an electromagnet, secured to said signaling member and capable of movement therewith, positioned substantially between the first mentioned magnets, and means for actuating the various units, comprising a battery, a primary circuit extending therefrom, means interposed in said primary circuit for subdividing it into a number of secondary circuits, said means being also capable of controlling said secondary circuits, each of said magnets being provided with one of said secondary circuits, filament in said signaling member being directly in circuit with the primary circuit, and means, independent of said first mentioned means, for controlling this latter circuit.

In testimony whereof I hereunto affix my signature, in the presence of two subscribing witnesses.

CLARENCE R. TAGGART.

Witnesses:
RUSSELL K. ANNIS,
FRED J. HOWARD.